Jan. 13, 1953   W. DALTON   2,625,116
LOCOMOTIVE WHEEL AND AXLE DRIVE ASSEMBLY
Filed April 2, 1949

INVENTOR
WILLIAM DALTON.
BY Maurice W. Grady
ATTORNEY

Patented Jan. 13, 1953

2,625,116

UNITED STATES PATENT OFFICE 2,625,116

LOCOMOTIVE WHEEL AND AXLE DRIVE ASSEMBLY

William Dalton, Schenectady, N. Y.

Application April 2, 1949, Serial No. 85,137

3 Claims. (Cl. 105—96.2)

This invention relates to a locomotive wheel and axle drive assembly.

Diesel engines of the switcher type are designed for a varied service which requires a machine so proportioned that it will readily pass over the relatively sharp curves encountered in railroad yards; will start in either direction easily and quickly, and at the same time have ample tractive force to move heavy loads. To accomplish this, the diesel switcher has its entire weight resting on the axles of the driving wheels, the use of leading and trailing trucks being dispensed with. Consequently, when moving along sharp curves, there is a high curve resistance and the wheels and axles are subjected to severe strains and wear.

It is accordingly the principal object of this invention to provide a wheel and axle assembly and driving apparatus therefor which will diminish the resistance encountered by the switcher on curved tracks. This is accomplished, generally speaking, by a duplex arrangement of traction motors between the truck wheels to drive a wheel and axle assembly in which one wheel is fixedly secured to the axle and the other wheel is freely rotatable in reference thereto. Either electric or fluid motors may be used.

Objects and advantages other than those above specifically set forth will be apparent from the following description when read in connection with the accompanying drawings in which.

Figure 1:
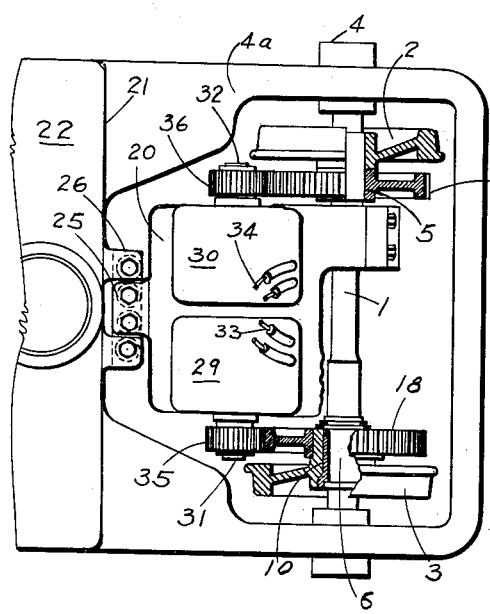
Fig. 1 is a plan view, partly in section, of one wheel and axle assembly of the invention with the duplex electric motors suspended between the axle and truck transom and with the transmission mechanism clearly shown.

Referring now to the drawings, the railway vehicle truck is partially illustrated therein and comprises, in general, a pair of axles 1 (only one of which is shown) upon each of which is mounted flanged wheels 2 and 3 journaled in journal boxes 4 in the usual manner. The frame 4a of the truck, shown diagrammatically, is resiliently supported upon the axles by conventional means which need not be illustrated since such means form no part of the invention.

Figure 5:
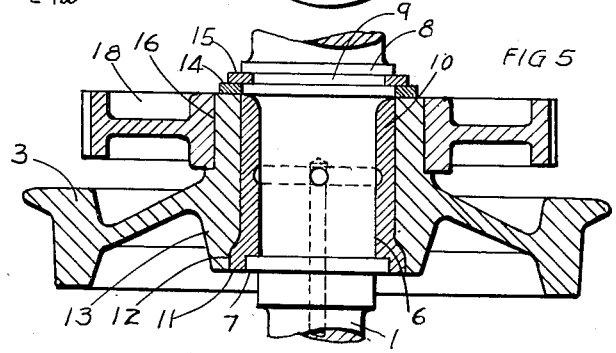
Fig. 5 is a view, partly in section and on a larger scale than in Fig. 1, of the freely rotatable wheel and a part of its driving gearing.

Wheel 2 is press fitted, shrunk upon, or keyed to the axle portion 5 of enlarged diameter so that it will rotate with the axle. Wheel 3, however, is mounted upon the enlarged axle portion 6 (Fig. 5) to rotate freely in reference thereto. Portion 6 has an outer shoulder 7 and an inner shoulder 8, the latter having greater width than the former. An annular recess 9 is formed centrally of the inner shoulder 8. A split bushing 10 is rotatably mounted upon axle portion 6, but is rigidly secured to the wheel 3 so that it moves as a unit with the wheel. The outer end of the bushing abuts the outer shoulder 7 and its inner end abuts the inner shoulder 8. Such outer end has a flange 11 shaped to fit a corresponding annular recess 12 formed in the hub 13 of wheel 3. The shoulder 7, the flange 11, and the recess 12 are so arranged in relation to each other that the wheel 3 is maintained against lateral movement outwardly. A retainer ring 14 is mounted upon the shoulder 8 to abut the inner end of the hub 13 and cooperates with the split ring 15 which is disposed in recess 9 to maintain the wheel 3 against lateral movement inwardly. Wheel 3 has a peripheral recess 16 upon the inner end of its hub for the reception of the gear wheel 18 which is press fitted or tightly shrunk therein. Obviously, gear wheel 18 is rotatable as a unit with wheel 3 in reference to the axle 1. At the other end of the axle, gear wheel 19 is press fitted or shrunk upon the enlarged axle portion 5 and, of course, is rotatable therewith.

Figure 2:
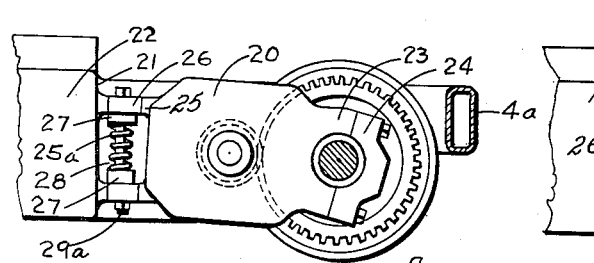
Fig. 2 is a side elevation, partly in section, showing details of the motor suspension arrangement.

The motor housing or frame 20 (Fig. 2) is interposed between the axle and the side wall of the transom 22 and at one end is formed with a pair of extensions 23 swivelled on said axle and removably secured thereon by axle caps 24. At its opposite or nose end the housing or frame has a transversely projecting lug member 25. A transversely extending motor supporting unit 25a is disposed below the lug 25 which rests thereon and is secured thereto. The supporting unit is carried by brackets 26 which are secured to the outer face of the side wall 21 of the transom. The supporting unit comprises upper and lower spring bars 27 and interposed helical springs 28 and bolts 29a for connecting bars 27 and holding springs 28 in position. The nose end of the housing is accordingly yieldingly supported and all vertical vibration thereof with respect to the transom is absorbed by the springs.

Mounted upon the motor housing are a pair of electric motors 29 and 30 arranged side by side with their armature shafts 31 and 32 respectively extending outwardly in opposite directions. Such motors are supplied with current by a source of power (not shown) through suitable flexible conduits 33 and 34. Pinions 35 and 36 are mounted upon the armature shafts and are arranged to engage and drive the gear wheels 18 and 19. The motor frame 20 is secured upon the axle and transom so that the torque thrust resulting from the engagement of the pinion and wheel gear is absorbed. As the truck may move along the track curve, the loose wheel 3 may increase or diminish its velocity depending upon the direction of the curve and the varying load requirements of each wheel will be controlled by the individual motors.

Figure 3:
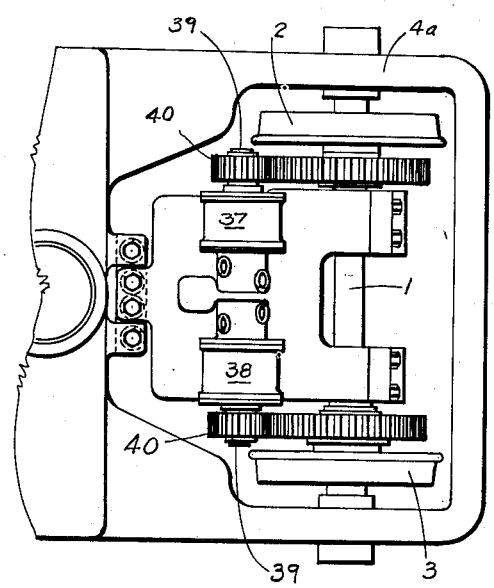
Fig. 3 is a plan view, partly in section, showing one wheel and axle assembly of the invention with outlined duplex fluid motors in position and with the transmission gears exposed.
Figure 4:
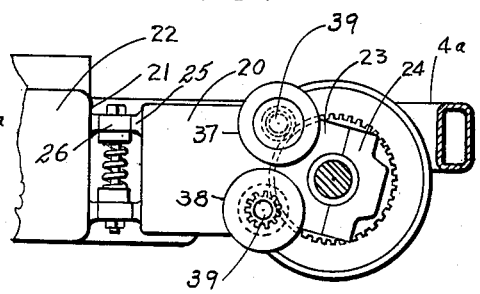
Fig. 4 is a side elevation, partly in section, showing details of a motor suspension with the motors arranged in staggered relation.

In lieu of electric motors, hydraulically driven motors 37 and 38 may be employed. Such motors are arranged side by side (Fig. 3) or staggered (Fig. 4), each with a shaft 39 extending laterally therefrom one in a direction opposite the other, and each shaft carrying a pinion 40 for engagement with the adjacent gear wheel. The details of construction of the fluid pumps, the fluid motors, and the fluid transmission systems are not shown since they may be of any conventional design.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

The invention claimed and desired to be secured by Letters Patent is:

1. A locomotive truck comprising a plurality of wheel and axle assemblies, each assembly having a wheel fixedly secured to the axle and a wheel freely rotatable in reference thereto, a truck frame supported on the axles, a transom forming part of the truck frame, a motor supporting frame one end of which is supported upon an axle and the other end of which is supported by the transom, and independent power units arranged upon the motor frame, one of which is operatively arranged to drive the axle and the other of which is operatively arranged to drive the freely rotatable wheel.

2. A locomotive wheel and axle drive apparatus comprising a plurality of wheel and axle assemblies, each assembly having a wheel fixedly secured to the axle and a wheel freely rotatable in reference thereto, the latter wheel having a hub; a truck frame supported on the axles; a cross piece forming part of the truck frame; a motor supporting frame, one end of which is supported upon an axle and the other end of which is supported by the cross piece; an electric motor on the frame having its armature extending outwardly in a line parallel to the axle; a pinion of such armature; a second electric motor disposed beside the first motor and having its armature extending outwardly in the direction opposite to that of the first shaft; a pinion on the second armature; a gear wheel on the axle driven by one pinion; and a gear wheel fixedly mounted on the hub of the freely rotatable wheel and driven by the other pinion.

3. A locomotive wheel and axle drive apparatus comprising a plurality of wheel and axle assemblies, each assembly having a wheel fixedly secured to the axle and a wheel freely rotatable in reference thereto, the latter wheel having a hub; a truck frame supported on the axles; a cross piece forming part of the truck frame; a motor-supporting frame, one end of which is supported upon an axle and the other end of which is supported by the cross piece; a fluid motor on the frame having a shaft extending outwardly in a line parallel to the axle; a pinion on such shaft; a second fluid motor disposed beside the first motor and having its shaft extending outwardly in the direction opposite to that of the first shaft; a pinion on the second shaft; a gear wheel on the axle driven by one pinion; and a gear wheel fixedly mounted on the hub of the freely rotatable wheel and driven by the other pinion.

WILLIAM DALTON.

REFERENCES CITED

The following references are of record in the file of this patent:

UNITED STATES PATENTS

| Number | Name | Date |
|---|---|---|
| 887,483 | Ledwinka | May 12, 1908 |
| 935,589 | Davis | Sept. 28, 1909 |
| 1,038,962 | Rivers | Sept. 17, 1912 |
| 1,810,834 | Klein | June 16, 1931 |
| 2,254,499 | Seelinger | Sept. 2, 1941 |
| 2,488,785 | Watter | Nov. 22, 1949 |

FOREIGN PATENTS

| Number | Country | Date |
|---|---|---|
| 496,993 | Germany | Nov. 3, 1930 |